(12) United States Patent
Nakayama

(10) Patent No.: US 9,688,828 B2
(45) Date of Patent: Jun. 27, 2017

(54) ANTISTATIC NON-CROSSLINKED FOAMED POLYETHYLENE RESIN PARTICLES AND MOLDED NON-CROSSLINKED FOAMED POLYETHYLENE RESIN BODY

(75) Inventor: Kiyotaka Nakayama, Settsu-shi (JP)

(73) Assignee: KANEKA CORPORATION, Osaka-shi (JP)

( * ) Notice: Subject to any disclaimer, the term of this patent is extended or adjusted under 35 U.S.C. 154(b) by 589 days.

(21) Appl. No.: 14/232,687

(22) PCT Filed: Jul. 13, 2012

(86) PCT No.: PCT/JP2012/067959
§ 371 (c)(1),
(2), (4) Date: Jan. 14, 2014

(87) PCT Pub. No.: WO2013/011951
PCT Pub. Date: Jan. 24, 2013

(65) Prior Publication Data
US 2014/0138868 A1 May 22, 2014

(30) Foreign Application Priority Data
Jul. 15, 2011 (JP) .................. 2011-156523

(51) Int. Cl.
*C08J 9/00* (2006.01)
*C08J 9/18* (2006.01)
(Continued)

(52) U.S. Cl.
CPC ............. *C08J 9/00* (2013.01); *B29C 44/3453* (2013.01); *B29C 44/3461* (2013.01);
(Continued)

(58) Field of Classification Search
None
See application file for complete search history.

(56) References Cited

U.S. PATENT DOCUMENTS

2005/0167870 A1  8/2005  Yanagihara et al.
2010/0267850 A1  10/2010  Yoshida et al.

FOREIGN PATENT DOCUMENTS

JP  47-21369 A  10/1972
JP  49-9574 A   1/1974
(Continued)

OTHER PUBLICATIONS

International Search Report, dated Oct. 16, 2012, issued in corresponding application No. PCT/JP2012/067959.
(Continued)

*Primary Examiner* — Jacob Thomas Minskey
(74) *Attorney, Agent, or Firm* — Westerman, Hattori, Daniels & Adrian, LLP

(57) ABSTRACT

Provided are non-crosslinked foamed polyethylene resin particles that have a bulk density BD of 10 g/L or more and 100 g/L or less and are obtained by foaming polyethylene resin particles containing an antistatic agent in an amount of 0.1 part by weight or more and 3 parts by weight or less with respect to 100 parts by weight of a polyethylene resin and having a density of 0.920 g/cm$^3$ or more and less than 0.940 g/cm$^3$, and the non-crosslinked foamed polyethylene resin particles have a shrinkage ratio of 3% or more and 30% or less determined in accordance with Formula (1). The non-crosslinked foamed polyethylene resin particles can simply afford an antistatic molded non-crosslinked foamed polyethylene resin body that has a small shrinkage ratio with respect to mold dimension, is deformed in a small degree, and has good surface stretch.

10 Claims, 1 Drawing Sheet

Each single-headed arrow has a length of 50 mm.
The thickness indicated by the double-headed arrow is measured with neck calipers.

(51) Int. Cl.
*C08F 110/02* (2006.01)
*B29C 44/34* (2006.01)
*C08J 9/12* (2006.01)
*C08J 9/232* (2006.01)

(52) U.S. Cl.
CPC ........... *C08F 110/02* (2013.01); *C08J 9/0023* (2013.01); *C08J 9/0028* (2013.01); *C08J 9/0061* (2013.01); *C08J 9/122* (2013.01); *C08J 9/18* (2013.01); *C08J 9/232* (2013.01); *C08J 2201/034* (2013.01); *C08J 2203/06* (2013.01); *C08J 2323/06* (2013.01); *C08J 2323/08* (2013.01); *C08J 2471/02* (2013.01)

(56) References Cited

FOREIGN PATENT DOCUMENTS

| | | |
|---|---|---|
| JP | 51-91971 A | 8/1976 |
| JP | 58-136632 A | 8/1983 |
| JP | 63-047128 A | 2/1988 |
| JP | 03-086737 A | 4/1991 |
| JP | 2000-017079 A | 1/2000 |
| JP | 2002-146082 A | 5/2002 |
| JP | 2009-057431 A | 3/2009 |
| JP | 2009-161738 A | 7/2009 |
| JP | 2010-059393 A | 3/2010 |
| JP | 2010-106238 A | 5/2010 |
| JP | 2010-159388 A | 7/2010 |
| WO | 03/097728 A1 | 11/2003 |
| WO | 2009/075208 A1 | 6/2009 |

OTHER PUBLICATIONS

Notification of Transmittal of Translation of the International Preliminary Report on Patentabililty (Form PCT/IB/338) of International Application No. PCT/JP2012/067959 mailed Jan. 30, 2014, with Forms PCT/IB/373 and PCT/ISA/237.

(a)
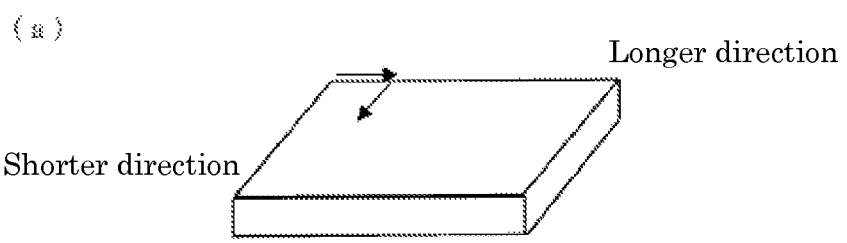
Longer direction
Shorter direction
(b)
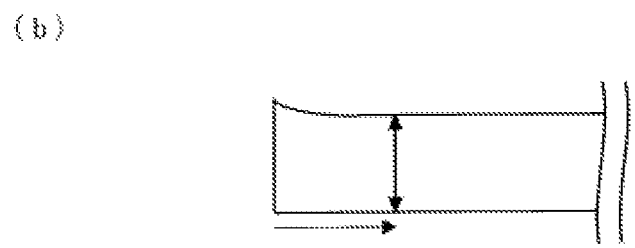
Each single-headed arrow has a length of 50 mm.
The thickness indicated by the double-headed arrow is measured with neck calipers.

ANTISTATIC NON-CROSSLINKED FOAMED POLYETHYLENE RESIN PARTICLES AND MOLDED NON-CROSSLINKED FOAMED POLYETHYLENE RESIN BODY

TECHNICAL FIELD

The present invention relates to an antistatic non-crosslinked low-density polyethylene resin particles and a molded non-crosslinked foamed polyethylene resin body produced from the non-crosslinked foamed low-density polyethylene resin particles.

BACKGROUND ART

Foam molded polyethylene resin bodies are widely used, for example, as a shock absorbing packing material. In particular, as a shock absorbing material used for products to which dirt or dust undesirably adhere, such as an electronic component, an antistatic foam molded polyethylene resin body is used. Such an antistatic foam molded polyethylene resin body is produced from foamed polyethylene resin particles containing an antistatic agent.

The foam molded polyethylene resin body produced from foamed polyethylene resin particles unfortunately has a large shrinkage ratio with respect to mold dimension and poor dimensional precision. These problems are likely to be markedly caused by the foamed polyethylene resin particles produced from a polyethylene resin containing an antistatic agent.

In order to solve the problems, various studies have been carried out. The studies are exemplified by a method of imparting foaming performance to foamed particles by adding various molding gases (Patent Document 1), a method of imparting foaming performance by compressing foamed particles (Patent Document 2), a method of adjusting the expansion ratio of pre-foamed particles and foamed particles used for molding within a predetermined range (Patent Document 3), and a method of giving a complicated temperature history after molding (Patent Documents 4 and 5).

However, these methods have advantages and disadvantages involving many equipment limitations and problems to be solved.

For example, the method described in Patent Document 1 by adding a molding gas requires an apparatus for adding the gas to foamed particles, and the gas addition apparatus and a molding processing are required to be integrated or to be continuously arranged in order not to reduce the foaming performance imparted.

The method described in Patent Document 2 by compressing foamed particles requires an apparatus for compression, and the compression apparatus and a molding machine are required to be integrated. In addition, the method produces defective products at a higher rate than the case without compression because foamed particles have poor packing properties.

The method described in Patent Document 3 by adjusting the expansion ratio of pre-foamed particles and foamed particles used for molding requires the preparation of the pre-foamed particles having an excessively high expansion ratio. In addition, in order to adjust the ratio, particles are required to be left in a temperature environment at about 60° C. for several hours so as to give a desired ratio.

The methods described in Patent Documents 4 and 5 by giving a complicated temperature history after molding complicate operations and thus are not an advantageous method for production processes.

In order to solve these problems in processes, a method of using polyethylene glycol or glycerin has been developed (Patent Documents 6 and 7). Patents employing an antistatic agent are also disclosed and include, for example, a method of employing a fatty acid glyceryl ester having an HLB value of 3 or more and less than 4 and a melting point of 35° C. or more and 75° C. or less (Patent Document 8) and a method of adjusting a melt index, a melt tension, and a cell size within particular ranges (Patent Document 9).

The methods in Patent Documents 6 and 7 have no problem concerning the shrinkage ratio with respect to mold dimension but have a problem of poor surface stretch. The method described in Patent Document 8 has no problem concerning staining and antistatic properties but produces a molded body having a large shrinkage ratio with respect to mold dimension. The method in Patent Document 9 has no problem concerning the shrinkage ratio in the thickness direction but has a problem of large shrinkage ratios with respect to mold dimension in the longer direction and in the shorter direction.

As described above, it is difficult to simply obtain non-crosslinked foamed polyethylene resin particles capable of affording an antistatic foam molded polyethylene resin body that has a small shrinkage ratio with respect to mold dimension, is deformed in a small degree, and has good surface stretch by a simple method.

CITATION LIST

Patent Literatures

Patent Document 1: JP-A No. S47-21369
Patent Document 2: JP-A No. S49-9574
Patent Document 3: JP-A No. S58-136632
Patent Document 4: JP-A No. S51-91971
Patent Document 5: JP-A No. S63-47128
Patent Document 6: JP-A No. 2009-161738
Patent Document 7: JP-A No. 2010-059393
Patent Document 8: JP-A No. 2002-146082
Patent Document 9: JP-A No. 2000-17079

SUMMARY OF INVENTION

Technical Problem

An object of the present invention is to provide non-crosslinked foamed polyethylene resin particles capable of simply producing an antistatic molded non-crosslinked foamed polyethylene resin body that has a small shrinkage ratio with respect to mold dimension, is deformed in a small degree, and has good surface stretch.

Solution to Problem

As a result of repeated intensive studies in order to solve the problems, the inventors of the present invention have found that in-mold foam molding of non-crosslinked foamed polyethylene resin particles having appropriate shrinkage properties and containing an antistatic agent can afford a molded non-crosslinked foamed polyethylene resin body that has a small shrinkage ratio with respect to mold dimension, is deformed in a small degree, and has good surface stretch of the foam molded body without, for example, imparting foaming performance by the addition of a molding gas, and have completed the present invention.

In other words, the present invention includes the following aspects:

[1] Non-crosslinked foamed polyethylene resin particles has a bulk density BD of 10 g/L or more and 100 g/L or less and are obtained by foaming polyethylene resin particles, the polyethylene resin particles containing an antistatic agent in an amount of 0.1 part by weight or more and 3 parts by weight or less with respect to 100 parts by weight of a polyethylene resin and having a density of 0.920 g/cm$^3$ or more and less than 0.940 g/cm$^3$. The non-crosslinked foamed polyethylene resin particles have a shrinkage ratio of 3% or more and 30% or less determined in accordance with Formula (1):

$$\text{Shrinkage ratio} = (BD - VBD) \times 100 / VBD \quad (1)$$

where BD is a bulk density of the non-crosslinked foamed polyethylene resin particles at 23° C. and 0.1 MPa (under standard atmospheric pressure), and VBD is a bulk density of the non-crosslinked foamed polyethylene resin particles at 23° C. under a reduced pressure of 0.002 MPa or less.

[2] In the non-crosslinked foamed polyethylene resin particles according to the aspect [1], the antistatic agent contains at least one compound selected from the group consisting of a glyceryl ester of a fatty acid having a carbon number of 6 or more and 24 or less and an aliphatic ethanolamine compound.

[3] In the non-crosslinked foamed polyethylene resin particles according to the aspect [1] or [2], the antistatic agent contains at least one compound selected from the group consisting of glyceryl stearate, hydroxyalkylethanolamine, stearyldiethanolamine monostearate, and stearyldiethanolamine.

[4] In the non-crosslinked foamed polyethylene resin particles according to any of the aspects [1] to [3], a hydrophilic compound is contained in an amount of 0.01 part by weight or more and 10 parts by weight or less with respect to 100 parts by weight of the polyethylene resin.

[5] In the non-crosslinked foamed polyethylene resin particles according to any of the aspects [1] to [4], the hydrophilic compound contains at least one compound selected from the group consisting of glycerin, polyethylene glycol, and polypropylene glycol.

[6] In the non-crosslinked foamed polyethylene resin particles according to the aspect [5], at least one compound selected from the group consisting of glycerin, polyethylene glycol, and polypropylene glycol is contained in an amount of 0.5 part by weight or more and 2 parts by weight or less with respect to 100 parts by weight of the polyethylene resin.

[7] In the non-crosslinked foamed polyethylene resin particles according to any of the aspects [1] to [6], an inorganic gas is used as a foaming agent and the non-crosslinked foamed polyethylene resin particles have an average cell size of 200 μm or more and 700 μm or less.

[8] A molded non-crosslinked foamed polyethylene resin body is obtained by filling a mold with the non-crosslinked foamed polyethylene resin particles according to any of the aspects [1] to [7] and then in-mold foam molding the non-crosslinked foamed polyethylene resin particles.

[9] A method for producing non-crosslinked foamed polyethylene resin particles having a bulk density BD of 10 g/L or more and 100 g/L or less and having a shrinkage ratio of 3% or more and 30% or less determined in accordance with Formula (1), the non-crosslinked foamed polyethylene resin particles being obtained by foaming polyethylene resin particles, the polyethylene resin particles containing an antistatic agent in an amount of 0.1 part by weight or more and 3 parts by weight or less with respect to 100 parts by weight of a polyethylene resin and having a density of 0.920 g/cm³ or more and less than 0.940 g/cm³, the method includes introducing polyethylene resin particles containing an antistatic agent in an amount of 0.1 part by weight or more and 3 parts by weight or less with respect to 100 parts by weight of a polyethylene resin and having a density of 0.920 g/cm³ or more and less than 0.940 g/cm³ into a pressure-resistant container together with water, a foaming agent, and a dispersant; warming and pressurizing the mixture; then discharging the polyethylene resin particles into an atmosphere at a lower pressure than that in the pressure-resistant container to afford non-crosslinked foamed polyethylene resin particles; applying internal pressure to the non-crosslinked foamed polyethylene resin particles by at least one inorganic gas selected from air, nitrogen, and carbon dioxide; and then heating the non-crosslinked foamed polyethylene resin particles with water vapor having a water vapor pressure of 0.03 MPa (gauge pressure) or more and 0.15 MPa (gauge pressure) or less to further foam the particles, thus producing non-crosslinked foamed polyethylene resin particles having a higher expansion ratio:

$$\text{Shrinkage ratio} = (BD - VBD) \times 100 / VBD \quad (1)$$

where BD is a bulk density of the non-crosslinked foamed polyethylene resin particles at 23° C. and 0.1 MPa (under standard atmospheric pressure), and VBD is a bulk density of the non-crosslinked foamed polyethylene resin particles at 23° C. under a reduced pressure of 0.002 MPa or less.

[10] In the method for producing non-crosslinked foamed polyethylene resin particles according to the aspect [9], the heating is performed with water vapor having a water vapor pressure of 0.045 MPa (gauge pressure) or more and 0.10 MPa (gauge pressure) or less.

Advantageous Effects of Invention

Non-crosslinked foamed polyethylene resin particles containing an antistatic agent of the present invention can simply afford an antistatic molded non-crosslinked foamed polyethylene resin body that has a small shrinkage ratio with respect to mold dimension, is deformed in a small degree, and has good surface stretch, without imparting foaming performance by the addition of a molding gas.

BRIEF DESCRIPTION OF DRAWINGS

FIG. 1 are schematic views showing a position for deformation measurement when the deformation of an in-mold foam molded body obtained in Example or Comparative Example is evaluated; FIG. 1(a) shows the measurement position on the molded body for deformation evaluation of the in-mold foam molded body obtained; and FIG. 1(b) shows the measurement position viewed from a side face of the molded body.

DESCRIPTION OF EMBODIMENTS

The present invention is non-crosslinked foamed polyethylene resin particles having a bulk density of 10 g/L or more and 100 g/L or less and obtained by foaming polyethylene resin particles that contain an antistatic agent in an amount of 0.1 part by weight or more and 3 parts by weight or less with respect to 100 parts by weight of a polyethylene resin and have a density of 0.920 g/cm³ or more and less than 0.940 g/cm³. The non-crosslinked foamed polyethylene resin particles are characterized by having a shrinkage ratio of 3% or more and 30% or less determined in accordance with Formula (1).

$$\text{Shrinkage ratio} = (BD - VBD) \times 100 / VBD \quad (1)$$

In Formula, BD is a bulk density of the non-crosslinked foamed polyethylene resin particles at 23° C. and 0.1 MPa (under standard atmospheric pressure), and VBD is a bulk density of the non-crosslinked foamed polyethylene resin particles at 23° C. and 0.002 MPa or less.

Examples of the polyethylene resin used in the present invention include a high-density polyethylene resin, a medium-density polyethylene resin, a low-density polyethylene resin, and a linear low-density polyethylene resin. Among them, in order to produce a highly foamed in-mold foam molded polyethylene resin body, a linear low-density polyethylene resin (hereinafter also abbreviated as "LLDPE") is preferably used.

Examples of the component of the polyethylene resin used in the present invention include a homopolymer of ethylene and a copolymer of ethylene and an α-olefin having a carbon number of 4 to 10.

Examples of the α-olefin having a carbon number of 4 to 10 include 1-butene, 1-pentene, 1-hexene, 3,3-dimethyl-1-butene, 4-methyl-1-pentene, 4,4-dimethyl-1-pentene, and 1-octene.

Such an α-olefin is preferably contained in an amount of 1 to 20% by weight and particularly preferably 3 to 10% by weight based on the total amount of the polyethylene resin. An α-olefin contained in an amount of more than 20% by weight is likely to deteriorate the strength against bending, compression, or other forces.

The polyethylene resin used in the present invention preferably has a density of 0.920 g/cm$^3$ or more and less than 0.940 g/cm$^3$ and more preferably 0.925 g/cm$^3$ or more and less than 0.940 g/cm$^3$. Polyethylene resin particles having a density of less than 0.920 g/cm$^3$ are likely to increase the shrinkage of non-crosslinked foamed polyethylene resin particles or a molded non-crosslinked foamed polyethylene resin body to be obtained, and polyethylene resin particles having a density of more than 0.940 g/cm$^3$ are likely to reduce the temperature range in which the particles can be foamed.

The antistatic agent used in the present invention is not particularly limited and examples include low-molecular antistatic agents such as a fatty acid ester compound, an aliphatic ethanolamine compound, and an aliphatic ethanolamide compound and polymer antistatic agents.

Examples of the fatty acid ester compound used in the present invention specifically include glyceryl esters of fatty acids having a carbon number of 6 or more and 24 or less, such as a glyceryl monoester of a fatty acid having a carbon number of 6 or more and 24 or less, a glyceryl diester of fatty acids having a carbon number of 6 or more and 24 or less, a glyceryl triester of fatty acids having a carbon number of 6 or more and 24 or less (more specifically, for example, glyceryl monostearate, glyceryl distearate, and glyceryl tristearate); and sorbitan esters of fatty acids having a carbon number of 6 or more and 24 or less.

Examples of the aliphatic ethanolamine compound used in the present invention specifically include aliphatic monoethanolamines and aliphatic diethanolamines (alkyl monoethanolamines and alkyl diethanolamines) such as stearylmonoethanolamine, stearyldiethanolamine, laurylmonoethanolamine, lauryldiethanolamine, myristylmonoethanolamine, myristyldiethanolamine, pentadecylmonoethanolamine, pentadecyldiethanolamine, palmitylmonoethanolamine, palmityldiethanolamine, margarylmonoethanolamine, margaryldiethanolamine, arachidylmonoethanolamine, arachidyldiethanolamine, behenylmonoethanolamine, behenyldiethanolamine, lignocerylmonoethanolamine, and lignoceryldiethanolamine; aliphatic diethanolamine fatty acid esters such as lauryldiethanolamine monolaurate, lauryldiethanolamine monomyristate, lauryldiethanolamine monopentadecylate, lauryldiethanolamine monopalmitate, lauryldiethanolamine monomargarate, lauryldiethanolamine monostearate, lauryldiethanolamine monoarachidate, lauryldiethanolamine monobehenate, lauryldiethanolamine monolignocerate, myristyldiethanolamine monolaurate, myristyldiethanolamine monomyristate, myristyldiethanolamine monopentadecylate, myristyldiethanolamine monopalmitate, myristyldiethanolamine monomargarate, myristyldiethanolamine monostearate, myristyldiethanolamine monoarachidate, myristyldiethanolamine monobehenate, myristyldiethanolamine monolignocerate, pentadecyldiethanolamine monolaurate, pentadecyldiethanolamine monomyristate, pentadecyldiethanolamine monopentadecylate, pentadecyldiethanolamine monopalmitate, pentadecyldiethanolamine monomargarate, pentadecyldiethanolamine monostearate, pentadecyldiethanolamine monoarachidate, pentadecyldiethanolamine monobehenate, pentadecyldiethanolamine monolignocerate, palmityldiethanolamine monolaurate, palmityldiethanolamine monomyristate, palmityldiethanolamine monopentadecylate, palmityldiethanolamine monopalmitate, palmityldiethanolamine monomargarate, palmityldiethanolamine monostearate, palmityldiethanolamine monoarachidate, palmityldiethanolamine monobehenate, palmityldiethanolamine monolignocerate, margaryldiethanolamine monolaurate, margaryldiethanolamine monomyristate, margaryldiethanolamine monopentadecylate, margaryldiethanolamine monopalmitate, margaryldiethanolamine monomargarate, margaryldiethanolamine monostearate, margaryldiethanolamine monoarachidate, margaryldiethanolamine monobehenate, margaryldiethanolamine monolignocerate, stearyldiethanolamine monolaurate, stearyldiethanolamine monomyristate, stearyldiethanolamine monopentadecylate, stearyldiethanolamine monopalmitate, stearyldiethanolamine monomargarate, stearyldiethanolamine monostearate, stearyldiethanolamine monoarachidate, stearyldiethanolamine monobehenate, stearyldiethanolamine monolignocerate, arachidyldiethanolamine monolaurate, arachidyldiethanolamine monomyristate, arachidyldiethanolamine monopentadecylate, arachidyldiethanolamine monopalmitate, arachidyldiethanolamine monomargarate, arachidyldiethanolamine monostearate, arachidyldiethanolamine monoarachidate, arachidyldiethanolamine monobehenate, arachidyldiethanolamine monolignocerate, behenyldiethanolamine monolaurate, behenyldiethanolamine monomyristate, behenyldiethanolamine monopentadecylate, behenyldiethanolamine monopalmitate, behenyldiethanolamine monomargarate, behenyldiethanolamine monostearate, behenyldiethanolamine monoarachidate, behenyldiethanolamine monobehenate, behenyldiethanolamine monolignocerate, lignoceryldiethanolamine monolaurate, lignoceryldiethanolamine monomyristate, lignoceryldiethanolamine monopentadecylate, lignoceryldiethanolamine monopalmitate, lignoceryldiethanolamine monomargarate, lignoceryldiethanolamine monostearate, lignoceryldiethanolamine monoarachidate, lignoceryldiethanolamine monobehenate, and lignoceryldiethanolamine monolignocerate; and hydroxyalkyl monoethanolamines.

Examples of the aliphatic ethanolamide compound used in the present invention specifically include aliphatic monoethanolamides and aliphatic diethanolamides (alkyl monoethanolamides and alkyl diethanolamides) such as stearylmonoethanolamide and stearyldiethanolamide.

Examples of the polymer antistatic agent used in the present invention specifically include Sankonol (manufactured by Sanko Chemical Industry Co., Ltd.) and Pelestat and Pelectron (each manufactured by Sanyo Chemical Industries, Ltd.).

These antistatic agents may be used singly or in combination of two or more of them. For example, a mixture of stearyldiethanolamine monostearate and stearyldiethanolamine is commercially available as Electro-Stripper TS-11B (manufactured by Kao Corporation), and a mixture of stearyldiethanolamine monostearate, stearyldiethanolamine, and an aliphatic alcohol is commercially available as Electro-Stripper TS-15B (manufactured by Kao Corporation). The aliphatic alcohol will be specifically described later.

Among them, a glyceryl ester of a fatty acid having a carbon number of 6 or more and 24 or less or an aliphatic ethanolamine compound is preferably contained and at least one compound selected from the group consisting of glyceryl stearate, hydroxyalkylethanolamine, stearyldiethanolamine monostearate, and stearyldiethanolamine is most preferably contained because such a compound has a large effect on the present invention.

In the present invention, the antistatic agent is preferably contained in an amount of 0.1 to 3 parts by weight and particularly preferably 0.2 to 2 parts by weight with respect to 100 parts by weight of the polyethylene resin.

An antistatic agent contained in an amount of less than 0.1 part by weight fails to exhibit antistatic properties, and an antistatic agent contained in an amount of more than 3 parts by weight is likely to increase the deformation or the shrinkage ratio with respect to mold dimension of a foam molded body to be obtained and to deteriorate the surface stretch of the foam molded body.

In order to improve the antistatic properties in the present invention, an aliphatic alcohol such as lauryl alcohol, myristyl alcohol, pentadecyl alcohol, palmityl alcohol, margaryl alcohol, stearyl alcohol, arachidyl alcohol, behenyl alcohol, and lignoceryl alcohol may be added.

In the present invention, the content of the aliphatic alcohol is not particularly limited and is preferably 0.001 to 2 parts by weight with respect to 100 parts by weight of the polyethylene resin. An aliphatic alcohol contained in an amount of less than 0.001 part by weight is likely to insufficiently improve the antistatic properties, and an aliphatic alcohol contained in an amount of more than 2 parts by weight is likely to make the uniform mixing in the polyethylene resin difficult.

In the present invention, polyethylene resins having various densities may be mixed as long as a mixed polyethylene resin has a density of 0.920 g/cm$^3$ or more and less than 0.940 g/cm$^3$. For example, LLDPE may be mixed with a low-density polyethylene (hereinafter also abbreviated as "LDPE") or a high-density polyethylene (hereinafter also abbreviated as "HDPE").

In the present invention, the non-crosslinked polyethylene resin particles have a gel content insoluble in heated xylene of 3.0% or less.

Here, the gel content is represented by the ratio of a gel component weight determined by the method below with respect to an original resin weight. In other words, into a 200-mesh wire mesh bag, 0.5 g of resin particles or foamed particles are charged and the open end of the wire mesh bag is folded so as not to spill the particles. The wire mesh bag is immersed in 50 ml of xylene boiled under atmospheric pressure for 3 hours, then cooled, and taken out of the xylene. This operation is repeated three times in total. The taken out wire mesh bag is dried at ambient temperature overnight, then is dried in an oven at 150° C. for 1 hour, and is allowed to be cooled to ambient temperature. The remaining component in the wire mesh bag after cooling is weighed as the gel component weight.

The non-crosslinked foamed polyethylene resin particles of the present invention have appropriate shrinkage properties and thus are highly foamed during molding as compared with particles having no shrinkage properties. This enables the formation of a molded body having a small shrinkage ratio with respect to mold dimension and good surface stretch without the further addition of a molding gas.

As a result of the study on various physical properties in order to exhibit appropriate shrinkage properties, the inventors of the present invention have found that particles can exhibit appropriate shrinkage properties by using a shrinkage ratio determined in accordance with Formula (1) from the bulk density BD of non-crosslinked foamed polyethylene resin particles at 23° C. and 0.1 MPa (under standard atmospheric pressure) and from the bulk density VBD of the non-crosslinked foamed polyethylene resin particles at 23° C. under a reduced pressure of 0.002 MPa or less.

The reduced pressure of 0.002 MPa or less is substantially a vacuum condition in a common vacuum apparatus (for example, a vacuum oven).

The non-crosslinked foamed polyethylene resin particles of the present invention have a shrinkage ratio of 3% or more and 30% or less and preferably 5% or more and 20% or less determined in accordance with Formula (1).

$$\text{Shrinkage ratio}=(BD-VBD)/VBD\times100 \quad (1)$$

In Formula, BD is a bulk density of the non-crosslinked foamed polyethylene resin particles at 23° C. and 0.1 MPa (under standard atmospheric pressure), and VBD is a bulk density of the non-crosslinked foamed polyethylene resin particles at 23° C. under a reduced pressure of 0.002 MPa.

Non-crosslinked foamed polyethylene resin particles having a shrinkage ratio of less than 3% are likely to be insufficiently foamed during in-mold foam molding, resulting in a molded non-crosslinked foamed polyethylene resin body having poor fusion and poor surface stretch. Non-crosslinked foamed polyethylene resin particles having a shrinkage ratio of more than 30% are likely to cause the surface fusion alone on a molded non-crosslinked foamed polyethylene resin body and to form the molded non-crosslinked foamed polyethylene resin body including the inside that fails to be fused.

The non-crosslinked foamed polyethylene resin particles of the present invention preferably have a bulk density BD of 10 g/L or more and 100 g/L or less. Particles having a bulk density BD of less than 10 g/L are likely to have an excessively large shrinkage ratio, and a molded non-crosslinked foamed polyethylene resin body formed by in-mold foam molding of such particles is likely to be shrunk or to be deformed. Particles having a bulk density BD of more than 100 g/L are likely to have an excessively small shrinkage ratio, and are likely to produce a heavy molded non-crosslinked foamed polyethylene resin body by in-mold foam molding and are unlikely to achieve weight reduction.

In the present invention, examples of the method for producing non-crosslinked foamed polyethylene resin particles having a shrinkage ratio of 3% or more and 30% or less include (1) a method of introducing polyethylene resin particles into a pressure-resistant container together with water, a foaming agent, and a dispersant, maintaining the inside of the pressure-resistant container at a predetermined temperature and a predetermined pressure, and then discharging the polyethylene resin particles into an atmosphere at a lower pressure than that in the pressure-resistant container, in which the temperature in the lower-pressure atmosphere is adjusted to 60° C. or more and 120° C. or less;

(2) a method of introducing polyethylene resin particles into a pressure-resistant container together with water, a foaming agent, and a dispersant, maintaining the inside of the pressure-resistant container at a predetermined temperature and a predetermined pressure, then discharging the polyethylene resin particles into an atmosphere at a lower pressure than that in the pressure-resistant container to afford non-crosslinked foamed polyethylene resin particles, applying internal pressure to the non-crosslinked foamed polyethylene resin particles by, for example, air, nitrogen, or carbon dioxide, and then heating the non-crosslinked foamed polyethylene resin particles with water vapor to further foam the particles, thus producing non-crosslinked foamed polyethylene resin particles having a higher expansion ratio (what is called "second-step foaming"), in which the water vapor for foaming has a pressure of 0.03 MPa (gauge pressure) or more and 0.15 MPa (gauge pressure) or less and preferably 0.045 MPa (gauge pressure) or more and 0.10 MPa or less;

(3) a method of heating the obtained non-crosslinked foamed polyethylene resin particles with water vapor without applying internal pressure; and (4) a method of using polyethylene resin particles containing a hydrophilic compound described below in a predetermined amount.

In the present invention, the non-crosslinked polyethylene resin particles preferably contain a hydrophilic compound in an amount of 0.01 part by weight or more and 10 parts by weight or less and more preferably 0.05 part by weight or more and 2 parts by weight or less with respect to 100 parts by weight of the polyethylene resin.

The non-crosslinked polyethylene resin particles containing a hydrophilic compound in an amount of less than 0.01 part by weight yield foamed particles having an excessively small water content and thus the foamed particles are likely to have an excessively small shrinkage ratio. In addition, such a hydrophilic compound is difficult to be uniformly dispersed in the resin particles, and this is likely to vary the quality among foamed particles. The non-crosslinked polyethylene resin particles containing a hydrophilic compound in an amount of more than 10 parts by weight yield foamed particles having an excessively large water content and thus the foamed particles are likely to be largely shrunk after water is removed from the foamed particles. In addition, the yielded foamed particles are likely to have nonuniform cells.

The hydrophilic compound includes compounds having a hydrophilic group such as a carboxyl group, a hydroxyl group, an amino group, an amido group, an ester group, a sulfo group, and a polyoxyethylene group in the molecule and derivatives of them and also includes hydrophilic polymers. Specific examples of the compound having a hydrophilic group and derivatives of them include compounds having a carboxyl group, such as lauric acid and sodium laurate and compounds having a hydroxyl group, such as ethylene glycol and glycerin. Additional examples of the hydrophilic organic compound include organic compounds having a triazine ring, such as melamine (chemical name: 1,3,5-triazine-2,4,6-triamine), isocyanuric acid, and condensates of isocyanuric acid.

The hydrophilic polymer is a polymer having a water absorption rate of 0.5% by weight or more determined in accordance with ASTM D570 and includes a water absorbing polymer that is insoluble in water, absorbs water in a weight several times to several hundred times the weight of the polymer itself, and is difficult to be dehydrated even under pressure and a water-soluble polymer that is soluble in water at ambient temperature or at a high temperature.

Specific examples of the hydrophilic polymer include ionomer resins obtained by neutralizing a carboxylic acid group of an ethylene-acrylic acid-maleic anhydride terpolymer or an ethylene-(meth)acrylic acid copolymer with an alkali metal ion such as a sodium ion and a potassium ion or with a transition metal ion such as a zinc ion and crosslinking the molecules to each other; carboxyl group-containing polymers such as an ethylene-(meth)acrylic acid copolymer; polyamides such as nylon-6, nylon-6,6, and a nylon copolymer; nonionic water absorbing polymers such as polyethylene glycol and polypropylene glycol; polyether-polyolefin resin block copolymers typified by Pelestat (trade name, manufactured by Sanyo Chemical Industries, Ltd.); and crosslinked polyethylene oxide polymers typified by AQUA CALK (trade name, manufactured by Sumitomo Seika Chemicals Co., Ltd.). These polymers may be used singly or in combination of two or more of them.

Among these hydrophilic polymers, nonionic water absorbing polymers and polyether-polyolefin resin block copolymers are preferred because such a polymer has comparatively good dispersion stability in a pressure-resistant container and exhibits water absorbability in a comparatively small amount.

Among these hydrophilic substances, glycerin, polyethylene glycol, or polypropylene glycol is preferably contained because the non-crosslinked polyethylene resin particles containing such a substance even in a small amount yield foamed particles that are likely to have a higher expansion ratio and not produce a foamed particles having an excessively small cell size, and such foamed particles are highly foamed during molding, thus readily producing a molded body having a small shrinkage ratio and good surface stretch.

In the present invention, at least one compound selected from the group consisting of glycerin, polyethylene glycol, and polypropylene glycol is preferably contained in an amount of 0.05 part by weight or more and 2 parts by weight or less and more preferably 0.05 part by weight or more and 0.5 part by weight or less with respect to 100 parts by weight of the polyethylene resin.

Polyethylene resin particles containing at least one compound selected from the group consisting of glycerin, polyethylene glycol, and polypropylene glycol in an amount of less than 0.05 part by weight are unlikely to increase the expansion ratio, and polyethylene resin particles containing at least one compound selected from the group consisting of glycerin, polyethylene glycol, and polypropylene glycol even in an amount of more than 2 parts by weight are unlikely to further increase the expansion ratio.

The polyethylene resin particles of the present invention may contain a cell nucleating agent, an antioxidant, a compatibilizer, an antistatic agent, a coloring agent, and a fire retardant, as necessary.

The polyethylene resin particles used in the present invention can be produced as below, for example.

Specifically, a polyethylene resin is mixed with the hydrophilic compound and other additives by a mixing method such as dry blending and a masterbatch method. Then, the mixture is melted and kneaded with an extruder, a kneader, a Banbury mixer (registered trademark), a roll, or other apparatuses and processed into polyethylene resin particles preferably having a particle weight of 0.2 to 10 mg/particle and more preferably 0.5 to 6 mg/particle. Alternatively, a liquid hydrophilic compound may be directly added into an extruder to be melted and kneaded.

The non-crosslinked foamed polyethylene resin particles in the present invention can be produced as below, for example.

Polyethylene resin particles are introduced into a pressure-resistant container together with water, a foaming agent, and a dispersant. The inside of the pressure-resistant container is maintained at a predetermined temperature and a predetermined pressure. Then, the polyethylene resin particles are discharged into an atmosphere at a lower pressure than that in the pressure-resistant container. Consequently, the non-crosslinked foamed polyethylene resin particles can be produced. Hereinafter, the foaming process is also called "single-step foaming."

The pressure-resistant container used in the foaming process is not particularly limited and may be any container capable of withstanding an inner pressure of the container and a temperature in the container during the production of non-crosslinked foamed polyethylene resin particles. Examples of the container include an autoclave pressure-resistant container.

The amount of water used in the foaming process is preferably 100 parts by weight or more and 500 parts by weight or less with respect to 100 parts by weight of the polyethylene resin particles in order to well disperse polyethylene resin particles in water.

The dispersant used in the foaming process is preferably a water-insoluble inorganic compound. Here, the water-insoluble inorganic compound is an inorganic compound that is dissolved in water at 25° C. in an amount of less than 1% by weight.

Specific examples of the water-insoluble inorganic compound include alkaline earth metal salts such as calcium carbonate, barium carbonate, tribasic calcium phosphate, dibasic calcium phosphate, tribasic magnesium phosphate, tribasic barium phosphate, barium sulfate, and calcium pyrophosphate; and aluminosilicates such as kaolin and clay.

The amount of the dispersant used in the foaming process varies depending on the type of a dispersant and the type and the amount of polyethylene resin particles and is not necessarily specified. The amount is preferably 0.2 part by weight or more and 5 parts by weight or less and more preferably 0.2 part by weight or more and 3 parts by weight or less with respect to 100 parts by weight of the polyethylene resin particles.

In the foaming process, a dispersion auxiliary may be used in combination with the dispersant. The dispersion auxiliary used is preferably a surfactant, and examples of the surfactant include an anionic surfactant, a nonionic surfactant, an amphoteric surfactant, an anionic polymer surfactant, and a nonionic polymer surfactant.

Examples of the anionic surfactant include sodium dodecylbenzenesulfonate, sodium n-paraffinsulfonate, sodium α-olefinsulfonate, and sodium alkyldiphenyl ether sulfonate.

Examples of the nonionic surfactant include polyoxyethylene alkyl ether and polyoxyethylene sorbitan fatty acid ester.

Examples of the amphoteric surfactant include alkyl betaines and alkylamine oxides. Examples of the anionic polymer surfactant include polyacrylates, polystyrene sulfonates, and maleic acid-α-olefin copolymer salts.

Examples of the nonionic polymer surfactant include polyvinyl alcohol.

These surfactants may be used singly or in combination of two or more of them.

A preferred dispersion auxiliary in the foaming process varies depending on the type of a dispersant to be used and is not necessarily specified. For example, for a process employing tribasic magnesium phosphate or tribasic calcium phosphate as the dispersant, an anionic surfactant is preferably used because such a surfactant stabilizes the dispersion state.

The amount of a dispersion auxiliary used in the foaming process varies depending on the type of a dispersion auxiliary and the type and the amount of a polyethylene resin used and is not necessarily specified. The amount is typically, preferably 0.001 part by weight or more and 0.2 part by weight or less with respect to 100 parts by weight of water.

Examples of the foaming agent used in the present invention include aliphatic hydrocarbons such as propane, isobutane, n-butane, isopentane, and n-pentane and mixtures of them; inorganic gases such as nitrogen, a carbon dioxide gas, and air; and water. Among them, an inorganic gas and water are preferred because such an agent has less environmental load and no risk of fire and explosion.

The amount of a foaming agent used varies depending on the type of a polyethylene resin used, the type of a foaming agent, an intended expansion ratio, or other factors and is not necessarily specified. The amount is preferably 2 parts by weight or more and 60 parts by weight or less and more preferably 4 parts by weight or more and 15 parts by weight or less with respect to 100 parts by weight of the polyethylene resin particles.

A water dispersed material containing polyethylene resin particles prepared in a pressure-resistant container as described above is pressurized to a predetermined pressure with stirring, heated to a predetermined temperature, and maintained for a predetermined period of time (typically 5 to 180 minutes, preferably 10 to 60 minutes). Then, a valve on a lower part of the pressure-resistant container is opened to discharge the pressurized water dispersed material containing the polyethylene resin particles to a low pressure atmosphere (typically to atmospheric pressure), and consequently non-crosslinked foamed polyethylene resin particles are produced.

The predetermined temperature (hereinafter also called "foaming temperature") during heating the inside of a pressure-resistant container varies depending on the melting point [hereinafter, Tm (° C.)] or the type of a polyethylene resin used or other factors and is not necessarily specified. The inside is preferably heated at the softening temperature of a polyethylene resin or higher and more preferably Tm−30 (° C.) or higher and Tm+10 (° C.) or lower.

The melting point of a polyethylene resin is determined as follows: with a differential scanning calorimeter, 4 to 6 mg of polyethylene resin particles are heated at a speed of 10° C./min from 10° C. to 190° C. to be melted; next the melted resin is cooled at a speed of 10° C./min from 190° C. to 10° C. to be crystallized; then the crystallized resin is heated at a speed of 10° C./min from 10° C. to 190° C.; and the melting peak temperature on the DSC curve obtained by the second temperature rise is regarded as the melting point.

The predetermined pressure (hereinafter also called "foaming pressure") during pressurizing the inside of a pressure-resistant container varies depending on the type of a polyethylene resin used, an intended expansion ratio of foamed particles, or other factors and is not necessarily specified. The predetermined pressure is preferably 1.5 MPa (gauge pressure) or more and 5 MPa or less (gauge pressure) and more preferably 2 MPa (gauge pressure) or more and 4.5 MPa or less (gauge pressure).

The pressurizing at a foaming pressure of less than 1.5 MPa (gauge pressure) is likely to give an excessively low expansion ratio, and the pressurizing at a foaming pressure of more than 5 MPa (gauge pressure) is likely to produce foamed particles having an excessively small cell size.

The temperature in the atmosphere to which a water dispersed material is discharged in the foaming process is typically ambient temperature. Warming or heating the atmosphere with a heating medium such as water vapor to a temperature of 60 to 120° C., preferably 80 to 110° C. enables the production of non-crosslinked foamed polyethylene resin particles having a shrinkage ratio of 3% or more and 30% or less and having a higher expansion ratio than that by the case of discharging the water dispersed material into an ambient temperature atmosphere.

The non-crosslinked foamed polyethylene resin particles (hereinafter also called "single-step foamed particles") obtained by the single-step foaming as described above may be subjected to in-mold foam molding without treatment.

Alternatively, the obtained non-crosslinked foamed polyethylene resin particles may be foamed again to prepare non-crosslinked foamed polyethylene resin particles having an intended expansion ratio, which may be subjected to in-mold foam molding.

Hereinafter, the process of further foaming once obtained foamed particles is also called "second-step foaming," and the obtained non-crosslinked foamed polyethylene resin particles are also called "second-step foamed particles."

The second-step foaming may be performed by a known method, which can be exemplified by the method below.

Specifically, non-crosslinked foamed polyethylene resin particles are charged in a pressure tank. The particles are pressurized with air at a predetermined pressure (in other words, air is introduced into the non-crosslinked foamed polyethylene resin particles and the particles are left for a predetermined period of time) to increase the internal pressure of the foamed particles higher than the atmospheric pressure. Then, the non-crosslinked foamed polyethylene resin particles are heated with water vapor preferably at 0.03 MPa (gauge pressure) or more and 0.15 MPa (gauge pressure) or less, more preferably at 0.045 MPa (gauge pressure) or more and 0.10 MPa (gauge pressure) or less. Consequently, the second-step foaming is performed.

The second-step foaming with water vapor at a pressure of less than 0.03 MPa (gauge pressure) yields foamed particles having a small shrinkage ratio, which are insufficiently foamed during molding to afford a molded body having a large shrinkage ratio with respect to mold dimension and poor surface stretch, or such second-step foaming is likely to increase the variation in the expansion ratio of foamed particles obtained and may increase the variation in the weight of a molded body to be obtained. The second-step foaming with water vapor at a pressure of more than 0.15 MPa (gauge pressure) causes foamed particles to be fused to each other and such particles may fail to be used for molding.

At the time, the internal pressure of non-crosslinked foamed polyethylene resin particles is preferably adjusted to 0.05 to 0.70 MPa (gauge pressure) and more preferably to 0.10 to 0.50 MPa (gauge pressure).

The foaming of foamed particles having an internal pressure of less than 0.05 MPa (gauge pressure) is likely to require water vapor at a higher pressure in order to improve the expansion ratio. The foaming of foamed particles having an internal pressure of more than 0.70 MPa (gauge pressure) is likely to cause cells included in the non-crosslinked foamed polyethylene resin particles to become open cells by the second-step foaming and in-mold foam molding of the foamed particles filled in a mold may afford a shrunk molded non-crosslinked foamed polyethylene resin body.

In the present invention, the non-crosslinked foamed polyethylene resin particles preferably have an average cell size of 200 μm or more and 700 μm or less and more preferably 300 μm or more and 600 μm or less.

Non-crosslinked foamed polyethylene resin particles having an average cell size of less than 200 μm are likely to afford a largely shrunk molded non-crosslinked foamed polyethylene resin body. Non-crosslinked foamed polyethylene resin particles having an average cell size of more than 700 μm are likely to afford a molded non-crosslinked foamed polyethylene resin body with poor appearance.

Here, the average cell size is determined as follows: In a cross-sectional image of a foamed particle under a microscope or other apparatuses, a straight line is drawn so as to pass through substantially the center of the foamed particle; the number n of cells through which the straight line passes is counted; the foamed particle size L (μm) between the intersection points of the straight line and the foamed particle surface is measured; and the average cell size is calculated in accordance with Formula (2).

Average cell size (μm)=$L/n$ (2)

In the present invention, in-mold foam molding is performed by filling a mold having a predetermined shape with non-crosslinked foamed polyethylene resin particles and then heating the particles with water vapor or other means to fuse the particles to each other, thus yielding a molded non-crosslinked foamed polyethylene resin body.

Usable examples of the in-mold foam molding include (a) a method of pressurizing foamed polyethylene resin particles with an inorganic gas such as air, nitrogen, and carbon dioxide to impregnate the foamed polyethylene resin particles with the inorganic gas and to apply a predetermined internal pressure to the foamed polyethylene resin particles, then filling a mold with the foamed polyethylene resin particles, and heating the particles with water vapor to fuse the foamed polyethylene resin particles, (b) a method of filling a mold with foamed polyethylene resin particles while pressurizing the foamed polyethylene resin particles with a gas pressure and heating and fusing the foamed polyethylene resin particles with water vapor while using the recovery force of the foamed polyethylene resin particles, and (c) a method of filling a mold with foamed polyethylene resin particles without particular pretreatment and heating and fusing the foamed polyethylene resin particles with water vapor.

A molded non-crosslinked foamed polyethylene resin body obtained in the present invention has a small shrinkage ratio with respect to mold dimension, is deformed in a small degree, and has good surface stretch.

EXAMPLES

A method for producing non-crosslinked foamed polyethylene resin particles of the present invention will next be described in detail with reference to examples and comparative examples. The present invention is not intended to be limited to the examples below.

The evaluations in examples and comparative examples are performed by the methods below.

<Measurement of Melt Flow Index>

A melt flow index (MI) was determined with an MI meter in accordance with JIS K7210 in a condition of an orifice size of 2.0959±0.005 mmφ, an orifice length of 8.000±0.025 mm, a load of 2,160 g, and a resin temperature of 190±0.2° C.

<Measurement of Gel Content Insoluble in Heated Xylene>

Into a 200-mesh wire mesh bag, 0.5 g of resin particles or foamed particles were charged and the open end of the wire mesh bag was folded so as not to spill the particles. The wire mesh bag was immersed in 50 ml of xylene boiled under atmospheric pressure for 3 hours, then cooled, and taken out of the xylene. This operation was repeated three times in total. The taken out wire mesh bag was dried at ambient temperature overnight, then was dried in an oven at 150° C. for 1 hour, and was allowed to be cooled to ambient temperature. The remaining component in the wire mesh bag after cooling was weighed as the gel component weight.

The ratio of the obtained gel component weight with respect to the weight of the original resin particles or foamed particles was regarded as the gel content insoluble in heated xylene. Two samples were tested for a material and the average was calculated.

<Measurement of Expansion Ratio>

About 3 g or more and 10 g or less of obtained foamed particles were weighed. The particles were dried at 60° C. for 2 hours, then were left in a constant temperature and humidity room at 23° C. and 50% humidity for 1 hour, and were weighed as w (g). Next, the particles were charged in a graduated cylinder containing ethanol and the increased level in the graduated cylinder was measured as the volume v (cm$^3$) (submersion method). The true specific gravity $\rho_b$ of the foamed particles was calculated in accordance with $\rho_b$=w/v, and the expansion ratio K was determined in accordance with K=$\rho_r/\rho_b$ where $\rho_r$ is the density of the polyethylene resin particles before foaming.

In each of the examples and the comparative examples below, the polyethylene resin particles before foaming had a density of 0.926 g/cm$^3$.

<Measurement of Bulk Densities, BD and VBD>

BD and VBD are determined as follows:

Foamed particles to be measured were weighed as $W_1$, and the volume $V_1$ of the foamed particles was measured with a graduated cylinder at 23° C. in atmospheric pressure (standard atmospheric pressure, 0.1 MPa). In accordance with Formula (3), BD, the bulk density of the non-crosslinked foamed polyethylene resin particles at 23° C. and 0.1 MPa (under standard atmospheric pressure) was calculated.

BD(g/L)=$W_1/V_1$ (3)

Foamed particles to be measured were weighed as $W_2$, and were charged in a graduated pressure-resistant container. The pressure-resistant container was decompressed with a vacuum pump or other means. After the reduced pressure of 0.002 MPa or less was ascertained with a pressure gauge, the pressure-resistant container was vibrated with a vibrator until the upper level of the foamed particles reaches constant, and the upper level of the foamed particles in the pressure-resistant container was read as the volume $V_2$. During the decompressing, pushing the foamed particles against each other may interfere with the change in volume, and thus the pressure-resistant container was gradually decompressed while the pressure-resistant container was, for example, tilted so as not to interfere with the change in volume of the foamed particles.

In accordance with Formula (4), VBD, the bulk density of the non-crosslinked foamed polyethylene resin particles at 23° C. under a reduced pressure of 0.002 MPa or less was calculated.

$$VBD(g/L) = W_2/V_2 \quad (4)$$

In evaluations of a foam molded polyethylene resin body except antistatic property evaluation, an obtained foam molded body was dried in an atmosphere at 75 to 80° C. for 24 hours, then was left in a constant temperature and humidity room at 23° C. and 50% humidity for 24 hours, and was subjected to the evaluations. For the antistatic property evaluation, an obtained foam molded body was dried in an atmosphere at 75 to 80° C. for 24 hours, then was left in a constant temperature and humidity room at 23° C. and 50% humidity for 72 hours, and was subjected to the evaluation.
<Density Measurement of Foam Molded Body>

A foam molded body obtained by in-mold foam molding was dried in an atmosphere at 75 to 80° C. for 24 hours, then was left in a constant temperature and humidity room at 23° C. and 50% humidity for 24 hours, and was weighed as $W_3$. The foam molded body was submerged in water and the change in volume $V_3$ was measured. In accordance with Formula (5), the density (g/L) of the foam molded body was calculated.

$$\text{Density(g/L) of foam molded body} = W_3/V_3 \quad (5)$$

<Fusing Properties>

A crack having a depth of about 5 mm was made near the center of an obtained foam molded body with a knife or other means and the foam molded body was broken along the crack. The fracture surface was observed.

On the fracture surface, the ratio of the number of broken particles with respect to the total number of particles was calculated as the fused ratio of the molded body, and was evaluated on the basis of the standard below.
◯: A fused ratio is 80% or more.
Δ: A fused ratio is 60% or more and less than 80%.
x: A fused ratio is less than 60%.
<Shrinkage Ratio with Respect to Mold Dimension>

The longer length (in the direction of 400 mm) of an obtained foam molded body was measured with digital calipers [manufactured by Mitutoyo].

The shrinkage ratio with respect to mold dimension was calculated in accordance with Formula (6) where the corresponding mold length was $L_0$ and the foam molded body length was $L_1$, and was evaluated on the basis of the standard below.

$$\text{Shrinkage ratio with respect to mold dimension} = (L_0 - L_1)/L_0 \times 100 \quad (6)$$

◯: A shrinkage ratio with respect to mold dimension is 3% or less.
Δ: A shrinkage ratio with respect to mold dimension is more than 3% and 4% or less.
x: A shrinkage ratio with respect to mold dimension is more than 4%.
<Surface Stretch>

The edge of an obtained foam molded body was observed and evaluated on the basis of the standard below.
◯: Foamed particles adjacent to each other are well fused in the whole area and no clearance is observed between foamed particles.
Δ: Some clearances are observed between adjacent foamed particles.
x: Many clearances are observed between adjacent foamed particles.

Here, the edge of a foam molded body is a ridge where two faces of the in-mold foam molded body join.
<Deformation>

The thickness at a point where a sink mark was readily generated and that was 50 mm apart from the edge of a foam molded body in the longer direction and was 50 mm apart from the edge of the foam molded body in the shorter direction was measured with neck calipers [manufactured by Mitutoyo] and was evaluated on the basis of the standard below.
◯: A thickness is 48.5 mm or more.
Δ: A thickness is 47 mm or more and less than 48.5 mm.
x: A thickness is less than 47 mm.
<Antistatic Properties>

An obtained foam molded body was dried in an atmosphere at 75 to 80° C. for 24 hours and then was left in a constant temperature and humidity room at 23° C. and 50% humidity for 72 hours. An electric current was applied at 500 V for 1 minute and the surface resistivity was determined with a surface high resistivity meter [Hiresta HT-201, manufactured by Mitsubishi Petrochemical Co., Ltd.] in accordance with JIS K6911. The surface resistivities were measured at five points per sample and the average was calculated as the surface resistivity.

Example 1

[Preparation of Resin Particles]

With respect to 100 parts by weight of a linear low-density polyethylene having an MI of 2 g/10 min, a melting point of 123° C., and a gel content insoluble in heated xylene of 0.3% by weight, containing 8.2% by weight of 4-methyl-1-pentene as a comonomer, and having a resin density of 0.926 g/cm$^3$ as a base resin, 0.2 part by weight of glycerin [manufactured by Lion Corporation, purified glycerin D] as a hydrophilic compound, 1.0 part by weight of glyceryl monostearate [manufactured by Riken Vitamin Co., Ltd., Rikemal S-1001] as an antistatic agent, and 0.04 part by weight of talc [manufactured by Hayashi-Kasei Co., Ltd., Talcan PKS] as a cell controlling agent were dry-blended.

The dry-blended mixture was melted and kneaded with a single screw extruder at a resin temperature of 210° C. and extruded into strands through a circular die attached to the end of the extruder. The strands were cooled with water and then cut with a cutter to yield polyethylene resin particles having a particle weight of 1.3 mg/particle.
[Preparation of Foamed Particles]

In a pressure-resistant autoclave having a volume of 0.3 m$^3$, 100 parts by weight (80 kg) of the obtained polyethylene resin particles, 200 parts by weight of water, 0.5 part by weight of tribasic calcium phosphate [manufactured by Taihei Chemical Industrial Co., Ltd.] as a water-insoluble inorganic compound, and 0.03 part by weight of sodium alkylsulfonate as a surfactant were charged, and 7 parts by weight of carbon dioxide gas was added as a foaming agent with stirring.

The contents in the autoclave were heated to a foaming temperature of 123° C. Then, carbon dioxide gas was further added under pressure to pressurize the inside of the autoclave to a foaming pressure of 3.0 MPa (gauge pressure). The contents were maintained at the foaming temperature and the foaming pressure for 30 minutes. Then, a valve on a lower part of the autoclave was opened and the content in the autoclave was discharged through an orifice having a 3.6-mmφ hole to an atmosphere at 100° C. to thus afford non-crosslinked foamed polyethylene resin particles (single-step foamed particles).

Table 1 shows evaluation results of the non-crosslinked foamed polyethylene resin particles.
[Preparation of In-Mold Foam Molded Body]

Water was removed from the obtained non-crosslinked foamed polyethylene resin particles. Then, the resin particles were filled into a mold having a longer direction of 400 mm, a shorter direction of 300 mm, and a thickness of 50 mm and were subjected to in-mold foam molding at a water vapor pressure of 0.11 MPa (gauge pressure) to afford a molded non-crosslinked foamed polyethylene resin body.

Table 1 shows evaluation results of the molded non-crosslinked foamed polyethylene resin body.

Examples 2 and 3

Polyethylene resin particles, non-crosslinked foamed polyethylene resin particles, and a molded non-crosslinked foamed polyethylene resin body were obtained in a similar manner to that in Example 1 except that water was removed from the non-crosslinked foamed polyethylene resin particles (single-step foamed particles) obtained in Example 1 and then the resin particles (single-step foamed particles) were impregnated with air by air pressure treatment and were subjected to second-step foaming at the internal pressure and the water vapor pressure described in Table 1 in [Preparation of Foamed Particles].

Table 1 shows evaluation results of the non-crosslinked foamed polyethylene resin particles and the molded non-crosslinked foamed polyethylene resin body.

Example 4

Polyethylene resin particles, non-crosslinked foamed polyethylene resin particles, and a molded non-crosslinked foamed polyethylene resin body were obtained in a similar manner to that in Example 1 except that 2.0 parts by weight of glyceryl monostearate was used as the antistatic agent in [Preparation of Resin Particles] and the second-step foaming was carried out at the internal pressure and the water vapor pressure described in Table 1 in [Preparation of Foamed Particles].

Table 1 shows evaluation results of the non-crosslinked foamed polyethylene resin particles and the molded non-crosslinked foamed polyethylene resin body.

Example 5

Polyethylene resin particles, non-crosslinked foamed polyethylene resin particles, and a molded non-crosslinked foamed polyethylene resin body were obtained in a similar manner to that in Example 1 except that 1.0 part by weight of hydroxyalkylethanolamine [manufactured by Miyoshi Oil & Fat Co., Ltd., Duspar 125B] was used as the antistatic agent in [Preparation of Resin Particles] and the second-step foaming was carried out at the internal pressure and the water vapor pressure described in Table 1 in [Preparation of Foamed Particles].

Table 1 shows evaluation results of the non-crosslinked foamed polyethylene resin particles and the molded non-crosslinked foamed polyethylene resin body.

Example 6

Polyethylene resin particles, non-crosslinked foamed polyethylene resin particles, and a molded non-crosslinked foamed polyethylene resin body were obtained in a similar manner to that in Example 1 except that 1.0 part by weight of stearyldiethanolamine monostearate [manufactured by Kao Corporation, Electro-Stripper TS-6B] was used as the antistatic agent in [Preparation of Resin Particles] and the second-step foaming was carried out at the internal pressure and the water vapor pressure described in Table 1 in [Preparation of Foamed Particles].

Table 1 shows evaluation results of the non-crosslinked foamed polyethylene resin particles and the molded non-crosslinked foamed polyethylene resin body.

Example 7

Polyethylene resin particles, non-crosslinked foamed polyethylene resin particles, and a molded non-crosslinked foamed polyethylene resin body were obtained in a similar manner to that in Example 1 except that 1.0 part by weight of stearyldiethanolamine [manufactured by Tokyo Chemical Industry Co., Ltd., reagent grade] was used as the antistatic agent in [Preparation of Resin Particles] and the second-step foaming was carried out at the internal pressure and the water vapor pressure described in Table 1 in [Preparation of Foamed Particles].

Table 1 shows evaluation results of the non-crosslinked foamed polyethylene resin particles and the molded non-crosslinked foamed polyethylene resin body.

Example 8

Polyethylene resin particles, non-crosslinked foamed polyethylene resin particles, and a molded non-crosslinked foamed polyethylene resin body were obtained in a similar manner to that in Example 1 except that 1.0 part by weight of a mixture of stearyldiethanolamine monostearate and stearyldiethanolamine [manufactured by Kao Corporation, Electro-Stripper TS-11B] was used as the antistatic agent in [Preparation of Resin Particles] and the second-step foaming was carried out at the internal pressure and the water vapor pressure described in Table 1 in [Preparation of Foamed Particles].

Table 1 shows evaluation results of the non-crosslinked foamed polyethylene resin particles and the molded non-crosslinked foamed polyethylene resin body.

Example 9

Polyethylene resin particles, non-crosslinked foamed polyethylene resin particles (single-step foamed particles), and a molded non-crosslinked foamed polyethylene resin body were obtained in a similar manner to that in Example 1 except that 0.5 part by weight of polyethylene glycol [manufactured by Lion Corporation, PEG300, hereinafter called PEG] was used as the hydrophilic compound with respect to 100 parts by weight of the linear low-density polyethylene in [Preparation of Resin Particles].

Table 1 shows evaluation results of the non-crosslinked foamed polyethylene resin particles and the molded non-crosslinked foamed polyethylene resin body.

Example 10

Polyethylene resin particles, non-crosslinked foamed polyethylene resin particles (single-step foamed particles), and a molded non-crosslinked foamed polyethylene resin body were obtained in a similar manner to that in Example 6 except that 1.0 part by weight of hydroxyalkyletha-nolamine [manufactured by Miyoshi Oil & Fat Co., Ltd., Duspar 125B] was used as the antistatic agent in [Preparation of Resin Particles].

Table 1 shows evaluation results of the non-crosslinked foamed polyethylene resin particles and the molded non-crosslinked foamed polyethylene resin body.

Example 11

Polyethylene resin particles, non-crosslinked foamed polyethylene resin particles (single-step foamed particles), and a molded non-crosslinked foamed polyethylene resin body were obtained in a similar manner to that in Example 1 except that 0.5 part by weight of polypropylene glycol [manufactured by Wako Pure Chemical Industries, Ltd., average molecular weight: 300, hereinafter called PPG] was used as the hydrophilic compound with respect to 100 parts by weight of the linear low-density polyethylene in [Preparation of Resin Particles].

Table 1 shows evaluation results of the non-crosslinked foamed polyethylene resin particles and the molded non-crosslinked foamed polyethylene resin body.

TABLE 1

| | | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| Resin particles | Hydrophilic compound | | Glycerin | Glycerin | Glycerin | Glycerin | Glycerin | Glycerin | Glycerin | Glycerin | PEG | PEG | PEG |
| | Amount added | Parts by weight | 0.2 | 0.2 | 0.2 | 0.2 | 0.2 | 0.2 | 0.2 | 0.2 | 0.5 | 0.5 | 0.5 |
| | Antistatic agent | | Glyceryl monostearate | Glyceryl monostearate | Glyceryl monostearate | Glyceryl monostearate | Hydroxyalkyl ethanolamine | Stearyl diethanolamine monostearate | Stearyl diethanolamine | Mixture of stearyl diethanolamine monostearate and stearyl diethanolamine | Glyceryl monostearate | Hydroxyalkyl ethanolamine | Glyceryl monostearate |
| | Amount added | Parts by weight | 1 | 1 | 1 | 2 | 1 | 1 | 1 | 1 | 1 | 1 | 1 |
| Single-step foamed particles | Expansion ratio | Times | 10.1 | 10.1 | 10.1 | 11.1 | 10.5 | 10.5 | 10.3 | 10.9 | 9.1 | 9.4 | 8.9 |
| | BD | g/L | 52 | 52 | 52 | 50 | 51 | 51 | 51 | 50 | 59 | 58 | 60 |
| | VBD | g/L | 49 | 49 | 49 | 46 | 47 | 47 | 47 | 46 | 56 | 54 | 57 |
| | Shrinkage ratio | % | 6.1 | 6.1 | 6.1 | 8.7 | 8.5 | 8.5 | 8.5 | 8.7 | 5.4 | 7.4 | 5.3 |
| | Cell size | μm | 210 | 210 | 210 | 230 | 230 | 220 | 220 | 230 | 210 | 220 | 200 |
| | Gel content | % by weight | 0.8 | 0.8 | 0.8 | 0.8 | 0.8 | 0.8 | 0.8 | 0.8 | 0.9 | 0.9 | 0.7 |
| Second-step foaming condition | Internal pressure | MPa·G | | 0.22 | 0.12 | 0.21 | 0.20 | 0.21 | 0.21 | 0.21 | 0.29 | 0.25 | 0.31 |
| | Vapor pressure | MPa·G | | 0.06 | 0.09 | 0.05 | 0.06 | 0.05 | 0.05 | 0.05 | 0.05 | 0.06 | 0.06 |
| Second-step foamed particles | Expansion ratio | Times | | 27.2 | 27.5 | 26.9 | 26.9 | 27.0 | 27.0 | 27.0 | 26.8 | 27.5 | 26.7 |
| | BD | g/L | | 19.8 | 19.7 | 20.0 | 20.0 | 19.9 | 19.9 | 19.9 | 20.1 | 19.7 | 20.2 |
| | VBD | g/L | | 18.1 | 16.9 | 18.2 | 18.1 | 18.1 | 18.1 | 18.1 | 19.1 | 17.5 | 19.1 |
| | Shrinkage ratio | % | | 9.4 | 16.6 | 9.9 | 10.5 | 9.9 | 9.9 | 9.9 | 5.2 | 12.6 | 5.8 |
| | Cell size | μm | | 300 | 320 | 320 | 330 | 310 | 310 | 320 | 300 | 320 | 300 |
| | Gel content | % by weight | | 0.7 | 0.7 | 0.8 | 0.9 | 0.8 | 0.8 | 0.8 | 0.6 | 0.8 | 0.7 |
| Foam molded body | Density | g/L | 55.2 | 21.5 | 21.3 | 22.4 | 22.3 | 22.2 | 22.3 | 22.1 | 22.5 | 21.4 | 22.7 |
| | Surface resistivity | Ω□ | $1.6 \times 10^{11}$ | $2.1 \times 10^{11}$ | $1.7 \times 10^{11}$ | $6.2 \times 10^{10}$ | $1.2 \times 10^{11}$ | $9.5 \times 10^{10}$ | $9.9 \times 10^{10}$ | $6.2 \times 10^{10}$ | $2.4 \times 10^{11}$ | $1.3 \times 10^{11}$ | $2.5 \times 10^{11}$ |
| | Fusion | | ◯ | ◯ | ◯ | ◯ | ◯ | ◯ | ◯ | ◯ | ◯ | ◯ | ◯ |
| | Shrinkage ratio with respect to mold dimension | | ◯ | ◯ | ◯ | ◯ | ◯ | ◯ | ◯ | ◯ | ◯ | ◯ | ◯ |
| | Surface stretch | | △ | | | | | | | | | | |
| | Deformation | | ◯ | | | | | | | | | | |

Comparative Examples 1 and 2

Polyethylene resin particles, non-crosslinked foamed polyethylene resin particles, and a molded non-crosslinked foamed polyethylene resin body were obtained in a similar manner to that in Example 1 except that water was removed from the non-crosslinked foamed polyethylene resin particles (single-step foamed particles) obtained in Example 1 and then the resin particles were impregnated with air by air pressure treatment and subjected to second-step foaming at the internal pressure and the water vapor pressure described in Table 2 in [Preparation of Foamed Particles].

Table 2 shows evaluation results of the non-crosslinked foamed polyethylene resin particles and the molded non-crosslinked foamed polyethylene resin body.

Comparative Example 3

Polyethylene resin particles, non-crosslinked foamed polyethylene resin particles, and a molded non-crosslinked foamed polyethylene resin body were obtained in a similar manner to that in Example 1 except that water was removed from the non-crosslinked foamed polyethylene resin particles (single-step foamed particles) obtained in Example 5 and then the resin particles were impregnated with air by air pressure treatment and subjected to second-step foaming at the internal pressure and the water vapor pressure described in Table 2 in [Preparation of Foamed Particles].

Table 2 shows evaluation results of the non-crosslinked foamed polyethylene resin particles and the molded non-crosslinked foamed polyethylene resin body.

Comparative Example 4

Polyethylene resin particles, non-crosslinked foamed polyethylene resin particles, and a molded non-crosslinked foamed polyethylene resin body were obtained in a similar manner to that in Example 1 except that water was removed from the non-crosslinked foamed polyethylene resin particles (single-step foamed particles) obtained in Example 9 and then the resin particles were impregnated with air by air pressure treatment and subjected to second-step foaming at the internal pressure and the water vapor pressure described in Table 2 in [Preparation of Foamed Particles].

Table 2 shows evaluation results of the non-crosslinked foamed polyethylene resin particles and the molded non-crosslinked foamed polyethylene resin body.

Comparative Example 5

[Preparation of Resin Particles]

Polyethylene resin particles were obtained in a similar manner to that in Example 1 except that no hydrophilic compound was used.

[Preparation of Foamed Resin Particles]

The obtained polyethylene resin particles were treated in a similar manner to that in Example 1 to thus yield non-crosslinked foamed polyethylene resin particles (single-step foamed particles).

Table 2 shows evaluation results of the non-crosslinked foamed polyethylene resin particles.

[Preparation of In-mold Foam Molded Body]

The obtained non-crosslinked foamed polyethylene resin particles (second-step foamed particles) were treated in a similar manner to that in Example 1 to thus yield a molded non-crosslinked foamed polyethylene resin body.

Table 2 shows evaluation results of the molded non-crosslinked foamed polyethylene resin body.

TABLE 2

|  |  |  | Comparative Example 1 | Comparative Example 2 | Comparative Example 3 | Comparative Example 4 | Comparative Example 5 |
|---|---|---|---|---|---|---|---|
| Resin particles | Hydrophilic compound |  | Glycerin | Glycerin | Glycerin | PEG | — |
|  | Amount added | Parts by weight | 0.2 | 0.2 | 0.2 | 0.5 | — |
|  | Antistatic agent |  | Glyceryl monostearate | Glyceryl monostearate | Hydroxyalkyl ethanolamine | Glyceryl monostearate | Glyceryl monostearate |
|  | Amount added | Parts by weight | 1 | 1 | 1 | 1 | 1 |
| Single-step foamed particles | Expansion ratio | Times | 10.1 | 10.1 | 10.5 | 9.1 | 7.8 |
|  | BD | g/L | 52 | 52 | 51 | 59 | 69 |
|  | VBD | g/L | 49 | 49 | 47 | 56 | 68 |
|  | Shrinkage ratio | % | 6.1 | 6.1 | 8.5 | 5.4 | 1.5 |
|  | Cell size | μm | 210 | 210 | 230 | 210 | 210 |
|  | Gel content | % by weight | 0.8 | 0.8 | 0.8 | 0.9 | 0.8 |
| Second-step foaming condition | Internal pressure | MPa·G | 0.30 | 0.07 | 0.29 | 0.35 |  |
|  | Vapor pressure | MPa·G | 0.03 | 0.11 | 0.03 | 0.03 |  |
| Second-step foamed particles | Expansion ratio | Times | 26.9 | 25.5 | 27.3 | 27.1 |  |
|  | BD | g/L | 20.1 | 21.3 | 19.8 | 20.0 |  |
|  | VBD | g/L | 19.6 | 15.9 | 19.5 | 19.5 |  |
|  | Shrinkage ratio | % | 2.6 | 34.0 | 1.5 | 2.6 |  |
|  | Cell size | μm | 300 | 310 | 330 | 320 |  |
|  | Gel content | % by weight | 0.7 | 0.7 | 0.8 | 0.6 |  |
| Foam molded body | Bulk density | g/L | 22.8 | 23.9 | 22.4 | 23.3 | 76.2 |
|  | Surface resistivity | Ω/□ | $1.7 \times 10^{11}$ | $2.1 \times 10^{11}$ | $8.9 \times 10^{10}$ | $2.3 \times 10^{11}$ | $1.5 \times 10^{11}$ |
|  | Fusion properties |  | Δ | X | Δ | Δ | Δ |
|  | Shrinkage ratio with respect to mold dimension |  | Δ | ◯ | Δ | Δ | ◯ |
|  | Surface stretch |  | X | ◯ | X | X | X |
|  | Deformation |  | Δ | ◯ | ◯ | Δ | ◯ |

The invention claimed is:

1. Non-crosslinked foamed polyethylene resin particles having a bulk density BD of 10 g/L or more and 100 g/L or less and obtained by foaming polyethylene resin particles, the polyethylene resin particles containing an antistatic agent in an amount of 0.1 part by weight or more and 3 parts by weight or less and a hydrophilic compound in an amount of 0.01 part by weight or more and 10 parts by weight or less respectively with respect to 100 parts by weight of a polyethylene resin and having a density of 0.920 g/cm$^3$ or more and less than 0.940 g/cm$^3$, the non-crosslinked foamed polyethylene resin particles having a shrinkage ratio of 3% or more and 30% or less determined in accordance with Formula (1):

$$\text{Shrinkage ratio}=(BD-VBD)\times100/VBD \quad (1)$$

where BD is a bulk density of the non-crosslinked foamed polyethylene resin particles at 23° C. and 0.1 MPa (under standard atmospheric pressure), and VBD is a bulk density of the non-crosslinked foamed polyethylene resin particles at 23° C. under a reduced pressure of 0.002 MPa or less.

2. The non-crosslinked foamed polyethylene resin particles according to claim 1, wherein the antistatic agent contains at least one compound selected from the group consisting of a glyceryl ester of a fatty acid having a carbon number of 6 or more and 24 or less and an aliphatic ethanolamine compound.

3. The non-crosslinked foamed polyethylene resin particles according to claim 1, wherein the antistatic agent contains at least one compound selected from the group consisting of glyceryl stearate, hydroxyalkylethanolamine, stearyldiethanolamine monostearate, and stearyldiethanolamine.

4. The non-crosslinked foamed polyethylene resin particles according to claim 1, wherein the hydrophilic compound contains at least one compound selected from the group consisting of glycerin, polyethylene glycol, and polypropylene glycol.

5. The non-crosslinked foamed polyethylene resin particles according to claim 4, wherein at least one compound selected from the group consisting of glycerin, polyethylene glycol, and polypropylene glycol is contained in an amount of 0.5 part by weight or more and 2 parts by weight or less with respect to 100 parts by weight of the polyethylene resin.

6. The non-crosslinked foamed polyethylene resin particles according to claim 1, wherein an inorganic gas is used as a foaming agent and the non-crosslinked foamed polyethylene resin particles have an average cell size of 200 □m or more and 700 □m or less.

7. A molded non-crosslinked foamed polyethylene resin body obtained by filling a mold with the non-crosslinked foamed polyethylene resin particles according to claim 1 and then in-mold foam molding the non-crosslinked foamed polyethylene resin particles.

8. A method for producing non-crosslinked foamed polyethylene resin particles according to claim 1, the method comprising:

introducing polyethylene resin particles containing an antistatic agent in an amount of 0.1 part by weight or more and 3 parts by weight or less and a hydrophilic compound in an amount of 0.01 part by weight or more and 10 parts by weight or less respectively with respect to 100 parts by weight of a polyethylene resin and having a density of 0.920 g/cm$^3$ or more and less than 0.940 g/cm$^3$ into a pressure-resistant container together with water, a foaming agent, and a dispersant;

warming and pressurizing the mixture; then discharging the polyethylene resin particles into an atmosphere at a lower pressure than that in the pressure-resistant container to afford non-crosslinked foamed polyethylene resin particles;

applying internal pressure to the non-crosslinked foamed polyethylene resin particles by at least one inorganic gas selected from air, nitrogen, and carbon dioxide; and then heating the non-crosslinked foamed polyethylene resin particles with water vapor having a water vapor pressure of 0.045 MPa (gauge pressure) or more and 0.10 MPa (gauge pressure) or less to further foam the particles, thus producing non-crosslinked foamed polyethylene resin particles having a higher expansion ratio.

9. Non-crosslinked foamed polyethylene resin particles having a bulk density BD of 10 g/L or more and 100 g/L or less and obtainable by foaming polyethylene resin particles, the polyethylene resin particles containing an antistatic agent in an amount of 0.1 part by weight or more and 3 parts by weight or less with respect to 100 parts by weight of a polyethylene resin and having a density of 0.920 g/cm$^3$ or more and less than 0.940 g/cm$^3$, the non-crosslinked foamed polyethylene resin particles having a shrinkage ratio of 3% or more and 30% or less determined in accordance with Formula (1):

$$\text{Shrinkage ratio}=(BD-VBD)\times100/VBD \quad (1)$$

where BD is a bulk density of the non-crosslinked foamed polyethylene resin particles at 23° C. and 0.1 MPa (under standard atmospheric pressure), and VBD is a bulk density of the non-crosslinked foamed polyethylene resin particles at 23° C. under a reduced pressure of 0.002 MPa or less, the non-crosslinked foamed polyethylene resin particles being obtained by:

introducing the polyethylene resin particles containing the antistatic agent in an amount of 0.1 part by weight or more and 3 parts by weight or less with respect to 100 parts by weight of a polyethylene resin and having a density of 0.920 g/cm$^3$ or more and less than 0.940 g/cm$^3$ into a pressure-resistant container together with water, a foaming agent, and a dispersant;

warming and pressurizing the mixture; then discharging the polyethylene resin particles into an atmosphere at a lower pressure than that in the pressure-resistant container to afford non-crosslinked foamed polyethylene resin particles;

applying internal pressure to the non-crosslinked foamed polyethylene resin particles by at least one inorganic gas selected from air, nitrogen, and carbon dioxide; and then heating the non-crosslinked foamed polyethylene resin particles with water vapor having a water vapor pressure of 0.045 MPa (gauge pressure) or more and 0.10 MPa (gauge pressure) or less to further foam the particles, thus obtaining non-crosslinked foamed polyethylene resin particles having a higher expansion ratio.

10. Non-crosslinked foamed polyethylene resin particles having a bulk density BD of 10 g/L or more and 100 g/L or less and obtainable by foaming polyethylene resin particles, the polyethylene resin particles containing an antistatic agent in an amount of 0.1 part by weight or more and 3 parts by weight or less and a hydrophilic compound in an amount of 0.01 part by weight or more and 10 parts by weight or less respectively with respect to 100 parts by weight of a polyethylene resin and having a density of 0.920 g/cm$^3$ or more and less than 0.940 g/cm$^3$, the non-crosslinked foamed polyethylene resin particles having a shrinkage ratio of 3% or more and 30% or less determined in accordance with Formula (1):

$$\text{Shrinkage ratio}=(BD-VBD)\times100/VBD \quad (1)$$

where BD is a bulk density of the non-crosslinked foamed polyethylene resin particles at 23° C. and 0.1 MPa (under standard atmospheric pressure), and VBD is a bulk density of the non-crosslinked foamed polyethylene resin particles at 23° C. under a reduced pressure of 0.002 MPa or less, the non-crosslinked foamed polyethylene resin particles being obtained by:

introducing the polyethylene resin particles containing the antistatic agent in an amount of 0.1 part by weight or more and 3 parts by weight or less and a hydrophilic compound in an amount of 0.01 part by weight or more and 10 parts by weight or less respectively with respect to 100 parts by weight of a polyethylene resin and having a density of 0.920 g/cm$^3$ or more and less than 0.940 g/cm$^3$ into a pressure-resistant container together with water, a foaming agent, and a dispersant;

maintaining the inside of the pressure-resistant container at a predetermined temperature and a predetermined pressure; and then discharging the polyethylene resin particles into an atmosphere at a lower pressure than that in the pressure-resistant container, in which the temperature in the lower-pressure atmosphere is adjusted to 60° C. or more and 120° C. or less.

* * * * *

UNITED STATES PATENT AND TRADEMARK OFFICE
CERTIFICATE OF CORRECTION

| | | |
|---|---|---|
| PATENT NO. | : 9,688,828 B2 | Page 1 of 1 |
| APPLICATION NO. | : 14/232687 | |
| DATED | : June 27, 2017 | |
| INVENTOR(S) | : Kiyotaka Nakayama | |

It is certified that error appears in the above-identified patent and that said Letters Patent is hereby corrected as shown below:

In the Claims

Column 23 Line 46:
Change:
resin particles have an average cell size of "200 ▯m"
To be:
resin particles have an average cell size of --200 μm--

Column 23 Line 47:
Change:
or more and "700 ▯m" or less.
To be:
or more and --700 μm-- or less.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*